3,318,830
AQUEOUS EMULSIONS OF VINYLACETATE-2-ETHYL HEXYL ACRYLATE-VINYL SULFONIC ACID TERPOLYMERS, AND METHOD OF PREPARATION
John R. Condon, Lebanon, N.J., and Julius J. Brezinski, St. Albans, and Howard M. Rife, Charleston, W. Va., assignors to Union Carbide Corporation, a corporation of New York
No Drawing. Continuation of application Ser. No. 64,255, Oct. 24, 1960. This application Dec. 21, 1964, Ser. No. 420,103
25 Claims. (Cl. 260—29.6)

This application is a continuation application of co-pending application Serial No. 64,255, entitled "Novel Emulsions Suitable for Use in Water-Based Paints," filed Oct. 24, 1960 and now abandoned.

This invention relates to novel aqueous emulsions of vinyl alkanoate interpolymers suitable for use as binders in water-based paints.

The use of aqueous emulsions of homopolymers and copolymers of vinyl alkanoates as binders in water-based paints is known. However, such emulsions are of limited value since they are incapable of adhering to chalky surfaces, and of producing tough, continuous coatings having good film cohesion and substrate adhesion in the presence of large quantities of pigment.

It has now been discovered, in accordance with the instant invention, that stable aqueous emulsions of vinyl alkanoate interpolymers, suitable for use as binders in water-based paints can be prepared by polymerizing a vinyl alkanoate wherein the acyl group of the alkanoate contains from two to ten carbon atoms, preferably vinyl acetate, with an alkyl acrylate wherein the alkyl group contains from six to twelve carbon atoms, preferably 2-ethylhexyl acrylate, and a minor amount of a vinyl sulfonate salt in water in the presence of certain anionic and nonionic surfactants. Such emulsions are characterized by excellent shelf-life, and excellent stability to alternate cycles of freezing and thawing. Films cast from such emulsions are tough and continuous, and are characterized by excellent clarity and surface gloss. When such emulsions are employed in paints, coatings characterized by excellent adhesion to chalky surfaces are obtained therefrom. Paints prepared from such emulsions are capable of producing tough, continuous coatings having good film cohesion and substrate adhesion even at pigment-volume concentrations of about 80 percent and higher. Pigment-volume concentration is a measure of the amount of pigment (including clays and coloring matter) employed with a given quantity of binder. It is, of course, desirable to employ paints having as high a pigment-volume concentration as possible without sacrificing any of the properties of the film obtained from the pigmented system. The pigment-volume concentration of a system can be determined in accordance with the following formula:

Pigment-Volume Concentration (percent) =
$$\frac{\text{volume of pigment}}{\text{total volume of paint solids}}$$

The emulsions of the instant invention are prepared by polymerizing a vinyl alkanoate with an alkyl acrylate and a minor amount of a vinyl sulfonate salt, by means of a polymerization catalyst, in an aqueous solution of certain anionic and nonionic surfactants. Optionally, the emulsion may also contain a water-soluble buffering agent and a filming aid, which compounds can be added either before or after polymerization.

Polymerization according to the process of the instant invention can be brought about my admixing the necessary components of the emulsion and heating the mixture at a temperature of from 65° C. to 90° C., preferably from 75° C. to 82° C. Preferably, polymerization is effected in the absence of oxygen. Since the polymerization reaction goes essentially to completion, all but a very small fraction of the monomers is consumed in the reaction. Hence the amount of interpolymer present in the final emulsion is essentially equal to the sum of the charge of the vinyl alkanoate, alkyl acrylate and vinyl sulfonate salt employed.

In order to produce the satisfactory emulsions, the components of the aqueous emulsion must be employed therein within certain rather narrow critical ranges. Thus, the concentration of interpolymer should be maintained between 50.0 percent by weight to 59.0 percent by weight, preferably from 51.0 percent by weight to 55.0 percent by weight, of the total overall weight of the emulsion. When employing a vinyl acetate-2-ethylhexyl acrylate-vinyl sulfonate interpolymer, the interpolymer can be obtained by polymerizing from 37.5 percent by weight to 53.4 percent by weight, preferably from 40.8 percent by weight to 47.5 percent by weight, of vinyl acetate with from 4.0 percent by weight to 14.5 percent by weight, preferably from 6.1 percent by weight to 10.8 percent by weight, of 2-ethylhexyl acrylate, and from 0.15 percent by weight to 0.50 percent by weight, preferably from 0.20 percent by weight to 0.35 percent by weight, of the vinyl sulfonate salt, based on the total weight of the overall mixture. The interpolymers obtained from such polymerization contain from 86.5 mole percent to 96.2 mole percent, preferably from 89.6 mole percent to 94.0 mole percent, of combined vinyl acetate, from 3.8 mole percent to 13.5 mole percent, preferably from 6.0 mole percent to 10.4 mole percent, of combined ethylhexyl acrylate, and from 0.11 mole percent to 0.39 mole percent, preferably from 0.15 mole percent to 0.17 mole percent, of combined vinyl sulfonate salt.

As will be evident from the above, only minor amounts of the vinyl sulfonate salt are employed in the polymerization and are present in the interpolymers. The use of greater amounts of such salts is undesirable because higher concentrations cause increased water sensitivity of the films produced from paints containing such interpolymers. The vinyl sulfonate salts which can be employed are the alkali metal and ammonium salts of vinyl sulfonic acid, including sodium vinyl sulfonate, potassium vinyl sulfonate, lithium vinyl sulfonate, and ammonium vinyl sulfonate.

The choice of anionic and nonionic surfactants employed in the aqueous emulsions of the instant invention is critical since only certain surfactants will produce stable emulsions capable of being used to produce water-based paints which closely adhere to chalky surfaces and form tough, continuous coatings having good film cohesion and substrate adhesion even at pigment-volume concentrations of 80 percent and higher. The anionic surfactants which have been found capable of producing satisfactory emulsions are the alkali metal and ammonium alkyl sulfate salts wherein the alkyl radicals each contain from 10 to 18 carbon atoms, preferably from 12 to 14 carbon atoms. Typical of the alkyl sulfate salts which can be employed are such compounds as sodium decyl sulfate, sodium tridecyl sulfate, sodium lauryl sulfate, sodium tetradecyl sulfate, sodium octadecyl sulfate, potassium decyl sulfate, potassium tetradecyl sulfate, ammonium tridecyl sulfate, ammonium octadecyl sulfate, lithium lauryl sulfate and the like. These compounds can be employed individually or in various combinations thereof. In order to produce satisfactory emulsions, the concentration of anionic surfactant should be maintained between 0.20 percent by weight to 0.60 percent by weight, preferably from 0.25 percent by weight to 0.35 percent by weight, of the total overall weight of the emulsion.

The nonionic surfactants which have been found capable of producing satisfactory emulsions include certain polyalkylene glycol ethers. Among the polyalkylene glycol ethers which can be employed are compounds which can be depicted by the general formula:

$$HO-(CH_2CH_2O)_m-(CH_2CH(CH_3)O)_n-(CH_2CH_2O)_o-H$$

wherein $m$, $n$ and $o$ are whole integers having a value sufficient to impart an average molecular weight of from 2,000 to 3,500, preferably from 2,500 to 3,000, to the polyalkylene glycol ether, there being from 20 percent by weight to 80 percent by weight, preferably from 30 percent by weight to 50 percent by weight, of $-CH_2CH_2O-$ radicals present in said polyalkylene glycol ether. Also illustrative of the polyalkylene glycol ethers which can be employed are compounds which can be depicted by the general formula:

$$RO-(CH_2CH(CH_3)O)_p-(CH_2CH_2O)_q-H$$

wherein R represents an alkyl radical having from 1 to 8 carbon atoms, preferably from 3 to 5 carbon atoms, and $p$ and $q$ are whole integers having a value sufficient to impart an average molecular weight of from 2,000 to 3,500, preferably from 2,500 to 3,000, to the polyalkylene glycol ether, there being from 20 percent by weight to 80 percent by weight, perferably from 30 percent by weight to 50 percent by weight, of $-CH_2CH_2O-$ radicals present in said polyalkylene glycol ether. Further illustrative of the polyalkylene glycol ethers which can be employed are compounds which can be depicted by the general formula:

$$RO-Z-(CH_2CH_2O)_r-H$$

wherein R represents an alkyl radical having from 1 to 8 carbon atoms, preferably from 3 to 5 carbon atoms, Z represents a combination of $-CH_2CH_2O-$ and $$-CH_2CH(CH_3)O-$$

radicals containing from 2 percent by weight to 5 percent by weight of $-CH_2CH_2O-$ radicals, and $r$ is a whole integer, there being a sufficient number of $-CH_2CH_2O-$ and $-CH_2CH(CH_3)O-$ radicals present to impart an average molecular weight of from 2,000 to 3,500, preferably from 2,500 to 3,000 to the polyalkylene glycol ether, and there being from 20 percent by weight to 80 percent by weight, preferably from 30 percent by weight to 50 percent by weight, of $-CH_2CH_2O-$ radicals present in said polyalkylene glycol ether.

In order to produce satisfactory emulsions, the concentration of nonionic surfactant should be maintained between 0.80 percent by weight to 2.50 percent by weight, preferably from 1.00 percent by weight to 2.00 percent by weight, of the total overall weight of the emulsion.

Any water-soluble vinyl polymerization catalyst can be employed in effecting polymerization according to the process of the instant invention. Typical of the vinyl polymerization catalysts which can be employed are such compounds as potassium persulfate, ammonium persulfate, sodium persulfate, potassium perborate, ammonium perborate, sodium perborate, hydrogen peroxide and the like. These compounds can be employed individually or in various mixtures thereof. The catalyst should be employed in an amount of from 0.05 percent by weight to 0.25 percent by weight, preferably from 0.10 percent by weight to 0.20 percent by weight, of the total overall weight of the emulsion.

It has been found that the shelf-life of the aqueous emulsions of the instant invention can be prolonged beyond a period of 12 months if the pH of the emulsion is maintained between 4.0 and 6.0. Consequently, the use of a buffering agent is desirable in order to maintain the pH of the emulsion within the recommended range, and any water-soluble buffering agent which will maintain the pH of the emulsion within this range can be employed. Typical of the buffering agents which can be employed are such compounds as sodium carbonate, potassium carbonate, ammonium carbonate, sodium acetate, potassium acetate, sodium bicarbonate, sodium phosphate, potassium phosphate, ammonium phosphate, sodium tetraborate, potassium tetraborate and the like. These compounds can be employed individually or in various combinations thereof.

The use of a filming aid in the aqueous emulsions of the instant invention is preferred in order to improve the filming potential of the emulsion at low temperatures, and to improve the compatibility of the various ingredients of the emulsion. Any water-soluble filming aid can be employed for this purpose. Typical of the filming aids which can be employed are such compounds as 2-methyl-2,4-pentanediol, 2-(2-ethoxyethoxy)ethanol, 2-(2-ethoxyethoxy)ethyl acetate, 2-(2-butoxyethoxy)ethyl acetate, ethylene glycol diacetate and the like. These compounds can be employed individually or in various mixtures thereof. The filming aid should be employed in an amount of from 0.50 percent by weight to 2.50 percent by weight, preferably from 0.80 percent by weight to 1.50 percent by weight, of the total overall weight of the emulsion.

The various components of the emulsion are, of course, dispersed in water.

The following examples are set forth for purposes of illustration so that those skilled in the art may better understand this invention, and it should be understood that they are not to be construed as limiting this invention in any manner.

EXAMPLE I

An admixture of 4.25 grams of sodium vinyl sulfonate, 5.10 grams of "Sipon WD" (sodium lauryl sulfate), 29.70 grams of "Tergitol XD" (a butoxypolyoxypropylene-polyoxyethylene ethanol), 1.70 grams of potassium persulfate, 1.70 grams of sodium carbonate, 17.0 grams of 2-methyl-2,4-pentanediol and 756.3 grams of water was prepared, and sparged with nitrogen to remove oxygen. To the resulting water-clear solution were added 44.0 grams of a mixture containing 752 grams of vinyl acetate and 136 grams of 2-ethylhexyl acrylate. The resulting mixture was heated at a temperature of 75° C. until the entire monomer charge had polymerized. The remaining 840 grams of the vinyl acetate-2-ethylhexyl acrylate mixture was then added over a period of two hours while the temperature of the resulting mixture was maintained at from 78° C. to 82° C. Following this, the mixture was heated for an additional hour at a temperature of from 82° C. to 85° C. to insure complete polymerization.

The resulting emulsion had a concentration of unreacted vinyl acetate and unreacted 2-ethylhexyl acrylate of 0.3 percent by weight and 0.05 percent by weight, respectively, a total non-volatile content of 54.2 percent by weight, and a pH of 5.5. The size of the solid particles present in the emulsion, as determined by means of an electron micrograph, ranged from 0.05 to 0.3 micron, with the mean particle size being 0.22 micron. The viscosity of the emulsion, as determined on a Brookfield Viscosimeter, model LVF, at 60 r.p.m. using a No. 4 spindle, was 800 centipoises. The absolute viscosity of the emulsion, as determined with a Ubbelohde Viscosimeter on a mixture of 3.6 parts of the emulsion in 3.4 parts of water and 93 parts of dimethyl formamide was 2.9 centipoises.

The emulsion was stored for over 15 months without any noticeable change in viscosity. When a sample of the emulsion was heated at a temperature of 80° C. for 18 hours, no thickening or coagulation of the emulsion occurred. When a 100-ml. sample of the emulsion was diluted to a solids concentration of 6 percent by weight, less than 0.1 cc. of solids settled out from the emulsion over a 24-hour period.

A film cast from the emulsion on a black, non-reflecting background was optically clear and had a 60° specular gloss of 190 on a Gardner Gloss Meter as determined in accordance with A.S.T.M. method D523–53P. The film haze, as determined in accordance with A.S.T.M. Designations D1003–52 A.S.T.M. Standards, 1955, pp. 320–326, Procedure A, was less than 0.1 percent. A film specimen of three mils thickness, prepared and dried for 72 hours at a temperature of 73° F. and at a relative humidity of 50 percent, could be elongated approximately 300 to 400 percent before breakage occurred.

The emulsion was used in the preparation of a water-based paint. The paint was prepared by charging 137.75 grams of "Ti-Pure R–100" (rutile titanium dioxide), 420.14 grams of calcium carbonate, 15.02 grams of a 25 percent by weight aqueous solution of "Tamol 731" (a pigment dispersant consisting of the sodium salts of carboxylated polyelectrolytes), 0.39 grams of "Bubble Breaker 746" (a commercial defoamer), and 230.0 grams of water to a pebble mill, grinding the mixture together over a period of 18 hours, and then dispersing therein, with agitation, in the order stated, 19.00 grams of ethylene glycol, 24.37 grams of "Carbitol" (2-(2-ethoxyethoxy)-ethanol), 79.58 grams of the emulsion prepared in accordance with the above procedure, 31.17 additional grams of water, and 258.08 grams of a 4 percent by weight aqueous solution of "Polyox WSR–301" (a polyethylene oxide).

The resulting paint had a non-volatile content of 50.7 percent by weight, a pH of 8.3, and a viscosity of 1030 centipoises, as determined on a Brookfield Viscosimeter, Model LVF, at 60 r.p.m. using a No. 4 spindle.

When a sample of the paint was successively frozen at −6° F. for 16 hours and then thawed at room temperature for 8 hours through three cycles, no thickening or coagulation of the paint occurred. A film from the paint brushed on a UF–1301 primed Morest chart, after aging for one week, withstood more than 8,000 cycles of scrubbing on a Gardner Washability Machine employing a 0.5 percent by weight solution of Ivory soap. This indicated the presence of a tough, continuous film.

The pigment-volume concentration of the paint was 80.4 percent.

EXAMPLE II

An admixture of 12.0 grams of "Tergitol 3" (sodium tridecyl sulfate), 36.0 grams of "Pluoronic L–62" (a polyalkylene glycol ether), 6.0 grams of sodium vinyl sulfonate, 2.4 grams of sodium carbonate, 2.4 grams of potassium persulfate, 24.0 grams of 2-methyl-2,4-pentanediol and 1069.0 grams of water was prepared, and sparged with nitrogen to remove oxygen. To the resulting water-clear solution were added 62.4 grams of a mixture containing 1060.8 grams of vinyl acetate and 187.2 grams of 2-ethylhexyl acrylate. The resulting mixture was heated at a temperature of 75° C. until the entire monomer charge had polymerized. The remaining 1185.6 grams of the vinyl acetate-2-ethylhexyl acrylate mixture was then added over a period of two hours while the temperature of the resulting mixture was maintained at from 78° C. to 82° C. Following this, the mixture was heated for an additional hour at a temperature of from 82° C. to 85° C. to insure complete polymerization.

The resulting emulsion had a concentration of unreacted vinyl acetate and unreacted 2-ethylhexyl acrylate of 0.35 percent by weight and 0.05 percent by weight, respectively, a total non-volatile content of 54.1 percent by weight, and a pH of 5.3. The viscosity of the emulsion, as determined on a Brookfield Viscosimeter, Model LVF, at 60 r.p.m. using a No. 4 spindle, was 1,000 centipoises. The absolute viscosity of the emulsion, as determined with a Ubbelohde Viscosimeter on a mixture of 3.6 parts of the emulsion in 3.4 parts of water and 93 parts of dimethyl formamide was 2.2 centipoises.

The emulsion was stored for over 15 months without any noticeable change in viscosity. When a sample of the emulsion was heated at a temperature of 80° C. for 18 hours, no thickening or coagulation of the emulsion occurred. When a 100-ml. sample of the emulsion was diluted to a solids concentration of 6 percent by weight, less than 0.1 cc. of solids settled out from the emulsion over a 24 hour period.

A film cast from the emulsion on a black, non-reflecting background was optically clear and had a 60° specular gloss of 185 on a Gardner Gloss Meter as determined in accordance with A.S.T.M. method D523–53P. The film haze, as determined in accordance with A.S.T.M. Designations D1003–52 A.S.T.M. Standards, 1955, pp. 320–326, Procedure A, was less than 0.1 percent. A film specimen of three mils thickness, prepared and dried for 72 hours at a temperature of 73° F. and at a relative humidity of 50 percent, could be elongated approximately 400 percent before breakage occurred.

The emulsion was used in the preparation of a water-based paint. The paint was prepared by charging 137.75 grams of "Ti-Pure R–100" (rutile titanium dioxide), 420.14 grams of calcium carbonate, 15.02 grams of a 25 percent by weight aqueous solution of "Tamol 731" (a pigment dispersant consisting of the sodium salts of carboxylated polyelectrolytes), 0.39 grams of "Bubble Breaker 746" (a commercial defoamer), and 230.0 grams of water to a pebble mill, grinding the mixture together over a period of 18 hours, and then dispersing therein, with agitation, in the order stated, 19.00 grams of ethylene glycol, 24.37 grams of "Carbitol" (2-(2-ethoxyethoxy)-ethanol), 79.58 grams of the emulsion prepared in accordance with the above procedure, 31.17 additional grams of water, and 258.08 grams of a 4 percent by weight aqueous solution of "Polyox WSR–301" (a polyethylene oxide).

The resulting paint had a non-volatile content of 50.7 percent by weight, and a viscosity of 1030 centipoises, as determined on a Brookfield Viscosimeter, Model LVF, at 60 r.p.m. using a No. 4 spindle.

When a sample of the paint was successively frozen at −6° F. for 16 hours and then thawed at room temperature for 8 hours through three cycles, no thickening or coagulation of the paint occurred. A film from the paint brushed on a UF–1301 primed Morest chart, after aging for one week, withstood more than 8,000 cycles of scrubbing on a Gardner Washability Machine employing a 0.5 percent by weight solution of Ivory soap. This indicated the presence of a tough, continuous film.

The pigment-volume concentration of the paint was 80.4 percent. The paint is useful for indoor coatings.

EXAMPLE III

A paste suitable for use in water-based paints was prepared by admixing 128.0 pounds of water with 0.65 pound of "Bubble Breaker 746" (a commercial defoamer), agitating the mixture at slow speed on a laboratory Model IVG Cowles Dissolver, and then adding, in the order stated, 8.74 pounds of a 25 percent by weight aqueous solution of "Tamol 731" a pigment dispersant consisting of the sodium salts of carboxylated polyelectrolytes), 0.32 pounds of tetrasodium pyrophosphate, 1.10 pounds of "Tergitol NPX" (a nonyl phenyl ether of polyethylene glycol), 19.21 pounds of ethylene glycol, 185.53 pounds of sifted "Tri-Pure R–610" (rutile titanium dioxide), 32.74 pounds of sifted "Ti-Pure FF" (anatase titanium dioxide), 56.22 pounds of sifted "ASP–600" (aluminum silicate), 27.31 pounds of sifted "Silversheen Special" (water ground mica), and 20.34 pounds of sifted "Lorite" (a mixture of diatomaceous silica and calcium carbonate), and increasing the agitation of the Dissolver to a speed of 4,400 r.p.m. for twenty minutes.

The paste was used in the preparation of a water-based paint. The paint was prepared by dispersing in a paint mixer, in the order stated, the paste prepared in accordance with the above-described procedure, 2.60 pounds of "Bubble Breaker 746," 397.17 pounds of an emulsion prepared in a manner similar to that described in Example I, 4.19 pounds of 2-ethylhexyl acetate, 134.09 pounds of a mixture containing 15.90 pounds of "Carbitol" (2-(2-ethoxyethoxy)ethanol) and 4.59 pounds of "Troysan PMA-30" (mildewcide) in 113.60 pounds of water, and 241.60 pounds of a solution of 9.66 pounds of "Cellosize WP-300" (hydroxyethyl cellulose) and 2.17 pounds of "Troysan PMA" (mildewcide) in 88.17 pounds of water.

The resulting paint had a non-volatile content of 50.1 percent by weight, and a viscosity of 1170 centipoises, as determined on a Brookfield Viscosimeter, Model LVF, at 60 r.p.m. using a No. 4 spindle. The pigment-volume concentration of the paint was 32.2 percent.

The paint, which is useful for outdoor coatings, was applied by means of a 0.007″ clearance blade to a wooden panel having a medium chalked coating thereon, and allowed to dry at room temperature for twenty-four hours. The resulting film was completely cut through with a knife in a cross-hatch pattern, and cellophane tape was applied firmly to the surface. When the cellophane tape was rapidly pulled away, 100 percent of the film remained adhered to the panel.

The test was repeated employing paints prepared in the manner described above but substituting certain commercially available emulsions for the emulsion prepared analogously to the manner described in Example I. The results obtained are summarized in Table A below.

TABLE A

| | Percent of film adherence to panel after cellophane removal |
|---|---|
| Resyn 25–2243 | 20 |
| Lytron 680 | 0 |

Table A clearly demonstrates the superior adhesion of paint coatings prepared from the emulsions of the instant invention as compared to paint coatings prepared from other emulsions.

What is claimed is:

1. A mixture suitable for use in the preparation of water-based paints consisting of:
   (a) from 37.5 percent by weight to 53.4 percent by weight of vinyl acetate;
   (b) from 4.0 percent by weight to 14.5 percent by weight of 2-ethylhexyl acrylate;
   (c) from 0.15 percent by weight to 0.50 percent by weight of a compound selected from the group consisting of alkali metal and ammonium salts of vinyl sulfonic acid;
   (d) from 0.20 percent by weight to 0.60 percent by weight of a compound selected from the group consisting of alkali metal and ammonium alkyl sulfate salts wherein the alkyl radicals each contain from 10 to 18 carbon atoms;
   (e) from 0.80 percent by weight to 2.50 percent by weight of a polyalkylene glycol ether selected from the group consisting of: polyalkylene glycol ethers represented by the general formula $$HO-(CH_2CH_2O)_m-(CH_2CH(CH_3)O)_n-(CH_2CH_2O)_o-H$$

wherein $m$, $n$ and $o$ are whole integers having a value sufficient to impart an average molecular weight of from 2,000 to 3,500 to the polyalkylene glycol ether, there being from 20 percent by weight to 80 percent by weight of $-CH_2CH_2O-$ radicals present in said polyalkylene glycol ether; polyalkylene glycol ethers represented by the general formula $$RO-(CH_2CH(CH_3)O)_p-(CH_2CH_2O)_q-H$$

wherein R represents an alkyl radical having from 1 to 8 carbon atoms, and $p$ and $q$ are whole integers having a value sufficient to impart an average molecular weight of from 2,000 to 3,500 to the polyalkylene glycol ether, there being from 20 percent by weight to 80 percent by weight of $-CH_2CH_2O-$ radicals present in said polyalkylene glycol ether; and polyalkylene glycol ethers represented by the general formula $$RO-Z-(CH_2CH_2O)_r-H$$

wherein R represents an alkyl radical having from 1 to 8 carbon atoms, Z represents a combination of $-CH_2CH_2O-$ and $-CH_2CH(CH_3)O-$ radicals containing from 2 percent by weight to 5 percent by weight of $-CH_2CH_2O-$ radicals, and $r$ is a whole integer, there being a sufficient number of $$-CH_2CH_2O-$$

and $-CH_2CH(CH_3)O-$ radicals present to impart an average molecular weight of from 2,000 to 3,500 to the polyalkylene glycol ether, and there being from 20 percent by weight to 80 percent by weight of $-CH_2CH_2O-$ radicals present in said polyalkylene glycol ether;
   (f) from 0.05 percent by weight to 0.25 percent by weight of a water-soluble vinyl polymerization catalyst; and
   (g) from 38.65 percent by weight to 48.95 percent by weight of water.

2. A mixture as in claim 1 wherein the mixture also contains a water-soluble buffering agent capable of maintaining the pH of the mixture between 4.0 and 6.0, and a correspondingly lesser amount of water.

3. A mixture as in claim 2 wherein the mixture also contains from 0.50 percent by weight to 2.50 percent by weight of a water-soluble filming aid, and a correspondingly lesser amount of water.

4. A mixture as in claim 2 wherein the vinyl sulfonic acid salt is sodium vinyl sulfonate.

5. A mixture as in claim 3 wherein the vinyl sulfonic acid salt is sodium vinyl sulfonate.

6. A mixture as in claim 3 wherein the buffering agent is sodium carbonate.

7. A mixture as in claim 5 wherein the buffering agent is sodium carbonate.

8. An aqueous emulsion suitable for use in water-based paints prepared by heating the mixture of claim 1 at a temperature of from 65° C. to 90° C.

9. An aqueous emulsion suitable for use in water-based paints prepared by heating the mixture of claim 2 at a temperature of from 65° C. to 90° C.

10. An aqueous emulsion suitable for use in water-based paints prepared by heating the mixture of claim 3 at a temperature of from 65° C. to 90° C.

11. An aqueous emulsion suitable for use in water-based paints prepared by heating the mixture of claim 4 at a temperature of from 65° C. to 90° C.

12. An aqueous emulsion suitable for use in water-based paints prepared by heating the mixture of claim 5 at a temperature of from 65° C. to 90° C.

13. An aqueous emulsion suitable for use in water-based paints prepared by heating the mixture of claim 6 at a temperature of from 65° C. to 90° C.

14. An aqueous emulsion suitable for use in water-based paints prepared by heating the mixture of claim 7 at a temperature of from 65° C. to 90° C.

15. An aqueous emulsion suitable for use in water-based paints prepared by heating, at a temperature of from 65° C. to 90° C., a mixture consisting of:
   (a) from 37.5 percent by weight to 53.4 percent by weight of vinyl acetate;
   (b) from 4.0 percent by weight to 14.5 percent by weight of 2-ethylhexyl acrylate;
   (c) from 0.15 percent by weight to 0.50 percent by weight of sodium vinyl sulfonate;

(d) from 0.20 percent by weight to 0.60 percent by weight of sodium lauryl sulfate;
(e) from 0.80 percent by weight to 2.50 percent by weight of a polyalkylene glycol ether selected from the group consisting of: polyalkylene glycol ethers represented by the general formula $$HO—(CH_2CH_2O)_m—(CH_2CH(CH_3)O)_n—(CH_2CH_2O)_o—H$$

wherein $m$, $n$ and $o$ are whole integers having a value sufficient to impart an average molecular weight of from 2,000 to 3,500 to the polyalkylene glycol ether, there being from 20 percent by weight to 80 percent by weight of —$CH_2CH_2O$— radicals present in said polyalkylene glycol ether; polyalkylene glycol ethers represented by the general formula $$RO—(CH_2CH(CH_3)O)_p—(CH_2CH_2O)_q—H$$

wherein R represents an alkyl radical having from 1 to 8 carbon atoms, and $p$ and $q$ are whole integers having a value sufficient to impart an average molecular weight of from 2,000 to 3,500 to the polyalkylene glycol ether, there being from 20 percent by weight to 80 percent by weight of —$CH_2CH_2O$— radicals present in said polyalkylene glycol ether; and polyalkylene glycol ethers represented by the general formula $$RO—Z—(CH_2CH_2O)_r—H$$

wherein R represents an alkyl radical having from 1 to 8 carbon atoms, Z represents a combination of —$CH_2CH_2O$— and —$CH_2CH(CH_3)O$— radicals containing from 2 percent by weight to 5 percent by weight of —$CH_2CH_2O$— radicals, and $r$ is a whole integer, there being a sufficient number of —$CH_2CH_2O$— and —$CH_2CH(CH_3)O$— radicals present to impart an average molecular weight of from 2,000 to 3,500 to the polyalkylene glycol ether, and there being from 20 percent by weight to 80 percent by weight of —$CH_2CH_2O$— radicals present in said polyalkylene glycol ether;
(f) from 0.05 percent by weight to 0.25 percent by weight of potassium persulfate;
(g) from 0.05 percent by weight to 0.30 percent by weight of sodium carbonate;
(h) from 0.50 percent by weight to 2.50 percent by weight of 2-methyl-2,4-pentanediol; and
(i) from 35.85 percent by weight to 48.40 percent by weight of water.

16. An aqueous emulsion suitable for use in water-based paints prepared by heating, at a temperature of from 65° C. to 90° C., a mixture consisting of:
(a) from 37.5 percent by weight to 53.4 percent by weight of vinyl acetate;
(b) from 4.0 percent by weight to 14.5 percent by weight of 2-ethylhexyl acrylate;
(c) from 0.15 percent by weight to 0.50 percent by weight of sodium vinyl sulfonate;
(d) from 0.20 percent by weight to 0.60 percent by weight of sodium tridecyl sulfate;
(e) from 0.80 percent by weight to 2.50 percent by weight of a polyalkylene glycol ether selected from the group consisting of: polyalkylene glycol ethers represented by the general formula $$HO—(CH_2CH_2O)_m—(CH_2CH(CH_3)O)_n—(CH_2CH_2O)_o—H$$

wherein $m$, $n$ and $o$ are whole integers having a value sufficient to impart an average molecular weight of from 2,000 to 3,500 to the polyalkylene glycol ether, there being from 20 percent by weight to 80 percent by weight of —$CH_2CH_2O$— radicals present in said polyalkylene glycol ether; polyalkylene glycol ethers represented by the general formula $$RO—(CH_2CH(CH_3)O)_p—(CH_2CH_2O)_q—H$$

wherein R represents an alkyl radical having from 1 to 8 carbon atoms, and $p$ and $q$ are whole integers having a value sufficient to impart an average molecular weight of from 2,000 to 3,500 to the polyalkylene glycol ether, there being from 20 percent by weight to 80 percent by weight of —$CH_2CH_2O$— radicals present in said polyalkylene glycol ether; and polyalkylene glycol ethers represented by the general formula $$RO—Z—(CH_2CH_2O)_r—H$$

wherein R represents an alkyl radical having from 1 to 8 carbon atoms, Z represents a combination of —$CH_2CH_2O$— and —$CH_2CH(CH_3)O$— radicals containing from 2 percent by weight to 5 percent by weight of —$CH_2CH_2O$— radicals, and $r$ is a whole integer, there being a sufficient number of —$CH_2CH_2O$— and —$CH_2CH(CH_3)O$— radicals present to impart an average molecular weight of from 2,000 to 3,500 to the polyalkylene glycol ether, and there being from 20 percent by weight to 80 percent by weight of —$CH_2CH_2O$— radicals present in said polyalkylene glycol ether.
(f) from 0.05 percent by weight to 0.25 percent by weight of potassium persulfate;
(g) from 0.05 percent by weight to 0.30 percent by weight of sodium carbonate;
(h) from 0.50 percent by weight to 2.50 percent by weight of 2-methyl-2,4-pentanediol; and
(i) from 35.85 percent by weight to 48.40 percent by weight of water.

17. A process for producing an aqueous emulsion suitable for use in water-based paints which comprises forming a mixture of:
(a) from 37.5 percent by weight to 53.4 percent by weight of vinyl acetate;
(b) from 4.0 percent by weight to 14.5 percent by weight of 2-ethylhexyl acrylate;
(c) from 0.15 percent by weight to 0.50 percent by weight of a compound selected from the group consisting of alkali metal and ammonium salts of vinyl sulfonic acid;
(d) from 0.20 percent by weight to 0.60 percent by weight of a compound selected from the group consisting of alkali metal and ammonium alkyl sulfate salts wherein the alkyl radicals each contain from 10 to 18 carbon atoms;
(e) from 0.80 percent by weight to 2.50 percent by weight of a polyalkylene glycol ether selected from the group consisting of: polyalkylene glycol ethers represented by the general formula $$HO—(CH_2CH_2O)_m—(CH_2CH(CH_3)O)_n—(CH_2CH_2O)_o—H$$

where $m$, $n$ and $o$ are whole integers having a value sufficient to impart an average molecular weight of from 2,000 to 3,500 to the polyalkylene glycol ether, there being from 20 percent by weight to 80 percent by weight of —$CH_2CH_2O$— radicals present in said said polyalkylene glycol ether; polyalkylene glycol ethers represented by the general formula $$RO—(CH_2CH(CH_3)O)_p—(CH_2CH_2O)_q—H$$

wherein R represents an alkyl radical having from 1 to 8 carbon atoms, and $p$ and $q$ are whole integers having a value sufficient to impart an average molecular weight of from 2,000 to 3,500 to the polyalkylene glycol ether, there being from 20 percent by weight to 80 percent by weight of —$CH_2CH_2O$— radicals present in said polyalkylene glycol ether;

and polyalkylene glycol ethers represented by the general formula $$RO-Z-(CH_2CH_2O)_r-H$$

wherein R represents an alkyl radical having from 1 to 8 carbon atoms, Z represents a combination of $-CH_2CH_2O-$ and $-CH_2CH(CH_3)O-$ radicals containing from 2 percent by weight to 5 percent by weight of $-CH_2CH_2O-$ radicals, and $r$ is a whole integer, there being a sufficient number of $$-CH_2CH_2O-$$

and $-CH_2CH(CH_3)O-$ radicals present to impart an average molecular weight of from 2,000 to 3,500 to the polyalkylene glycol ether, and there being from 20 percent by weight to 80 percent by weight of $-CH_2CH_2O-$ radicals present in said polyalkylene glycol ether;
(f) from 0.05 percent by weight to 0.25 percent by weight of a water-soluble vinyl polymerization catalyst; and
(g) from 38.65 percent by weight to 48.95 percent by weight of water;

and heating the admixture at a temperature of from 65° C. to 90° C.

18. A process as in claim 17 wherein the mixture also contains a water-soluble buffering agent capable of maintaining the pH of the emulsion between 4.0 and 6.0, and a correspondingly lesser amount of water.

19. A process as in claim 18 wherein the mixture also contains from 0.50 percent by weight to 2.50 percent by weight of a water-soluble filming aid, and a correspondingly lesser amount of water.

20. A process as in claim 18 wherein the vinyl sulfonic acid salt is sodium vinyl sulfonate.

21. A process as in claim 19 wherein the vinyl sulfonic acid salt is sodium vinyl sulfonate.

22. A process as in claim 19 wherein the buffering agent is sodium carbonate.

23. A process as in claim 21 wherein the buffering agent is sodium carbonate.

24. A process for producing an aqueous emulsion suitable for use in water-based paints which comprises forming a mixture of:
(a) from 37.5 percent by weight to 53.4 percent by weight of vinyl acetate;
(b) from 4.0 percent by weight to 14.5 percent by weight of 2-ethylhexyl acrylate;
(c) from 0.15 percent by weight to 0.50 percent by weight of sodium vinyl sulfonate;
(d) from 0.20 percent by weight to 0.60 percent by weight of sodium lauryl sulfate;
(e) from 0.80 percent by weight to 2.50 percent by weight of polyalkylene glycol ether selected from the group consisting of: polyalkylene glycol ethers represented by the general formula $$HO-(CH_2CH_2O)_m-(CH_2CH(CH_3)O)_n-(CH_2CH_2O)_o-H$$

wherein $m$, $n$ and $o$ are whole integers having a value sufficient to impart an average molecular weight of from 2,000 to 3,500 to the polyalkylene glycol ether, there being from 20 percent by weight to 80 percent by weight of $-CH_2CH_2O-$ radicals present in said polyalkylene glycol ether; polyalkylene glycol ethers represented by the general formula $$RO-(CH_2CH(CH_3)O)_p-(CH_2CH_2O)_q-H$$

wherein R represents an alkyl radical having from 1 to 8 carbon atoms, and $p$ and $q$ are whole integers having a value sufficient to impart an average molecular weight of from 2,000 to 3,500 to the polyalkylene glycol ether, there being from 20 percent by weight to 80 percent by weight of $-CH_2CH_2O-$ radicals present in said polyalkylene glycol ether; and polyalkylene glycol ethers represented by the general formula $$RO-Z-(CH_2CH_2O)_r-H$$

wherein R represents an alkyl radical having from 1 to 8 carbon atoms, Z represents a combination of $-CH_2CH_2O-$ and $-CH_2CH(CH_3)O-$ radicals containing from 2 percent by weight to 5 percent by weight of $-CH_2CH_2O-$ radicals, and $r$ is a whole integer, there being a sufficient number of $$-CH_2CH_2O-$$

and $-CH_2CH(CH_3)O-$ radicals present to impart an average molecular weight of from 2,000 to 3,500 to the polyalkylene glycol ether, and there being from 20 percent by weight to 80 percent by weight of $-CH_2CH_2O-$ radicals present in said polyalkylene glycol ether;
(f) from 0.05 percent by weight to 0.25 percent by weight of potassium persulfate;
(g) from 0.05 percent by weight to 0.30 percent by weight of sodium carbonate;
(h) from 0.50 percent by weight to 2.50 percent by weight of 2-methyl-2,4-pentanediol; and
(i) from 35.85 percent by weight to 48.40 percent by weight of water;

and heating the admixture at a temperature of from 65° C. to 90° C.

25. A process for producing an aqueous emulsion suitable for use in water-based paints which comprises forming a mixture of:
(a) from 37.5 percent by weight to 53.4 percent by weight of vinyl acetate;
(b) from 4.0 percent by weight to 14.5 percent by weight of 2-ethylhexyl acrylate;
(c) from 0.15 percent by weight to 0.50 percent by weight of sodium vinyl sulfonate;
(d) from 0.20 percent by weight to 0.60 percent by weight of sodium tridecyl sulfate;
(e) from 0.80 percent by weight to 2.50 percent by weight of a polyalkylene glycol ether selected from the group consisting of: polyalkylene glycol ethers represented by the general formula $$HO-(CH_2CH_2O)_m-(CH_2CH(CH_3)O)_n-(CH_2CH_2O)_o-H$$

wherein $m$, $n$ and $o$ are whole integers having a value sufficient to impart an average molecular weight of from 2,000 to 3,500 to the polyalkylene glycol ether, there being from 20 percent by weight to 80 percent by weight of $-CH_2CH_2O-$ radicals present in said polyalkylene glycol ether; polyalkylene glycol ether represented by the general formula $$RO-(CH_2CH(CH_3)O)_p-(CH_2CH_2O)_q-H$$

wherein R represents an alkyl radical having from 1 to 8 carbon atoms, and $p$ and $q$ are whole integers having a value sufficient to impart an average molecular weight of from 2,000 to 3,500 to the polyalkylene glycol ether, there being from 20 percent by weight to 80 percent by weight of $-CH_2CH_2O-$ radicals present in said polyalkylene glycol ether; and polyalkylene glycol ethers represented by the general formula $$RO-Z-(CH_2CH_2O)_r-H$$

wherein R represents an alkyl radical having from 1 to 8 carbon atoms, Z represents a combination of $-CH_2CH_2O-$ and $-CH_2CH(CH_3)O-$ radicals containing from 2 percent by weight to 5 percent by weight of $-CH_2CH_2O-$ radicals, and $r$ is a whole integer, there being a sufficient number of $$-CH_2CH_2O-$$

and —CH₂CH(CH₃)O— radicals present to impart an average molecular weight of from 2,000 to 3,500 to the polyalkylene glycol ether, and there being from 20 percent by weight to 80 percent by weight of —CH₂CH₂O— radicals present in said polyalkylene glycol ether;
(f) from 0.05 percent by weight to 0.25 percent by weight of potassium persulfate;
(g) from 0.5 percent by weight to 0.30 percent by weight of sodium carbonate;
(h) from 0.50 percent by weight to 2.50 percent by weight of 2-methyl-2,4-pentanediol; and
(i) from 35.85 percent by weight to 48.40 percent by weight of water;

and heating the admixture at a temperature of from 65° C. to 90° C.

References Cited by the Examiner
UNITED STATES PATENTS

| | | | |
|---|---|---|---|
| 2,300,920 | 11/1942 | Heuer | 260—29.6 |
| 2,508,341 | 5/1950 | Wilson | 260—29.6 |
| 2,726,230 | 12/1955 | Carlson | 260—29.6 |
| 2,753,318 | 7/1956 | Maeder | 260—29.6 |
| 2,867,597 | 1/1959 | Costello | 260—29.6 |
| 2,892,802 | 6/1959 | Budewitz | 260—29.6 |

MURRAY TILLMAN, *Primary Examiner.*

W. J. BRIGGS, Sr., *Assistant Examiner.*

UNITED STATES PATENT OFFICE
CERTIFICATE OF CORRECTION

Patent No. 3,318,830          Dated May 9, 1967

Inventor(s) John R. Condon et al

It is certified that error appears in the above-identified patent and that said Letters Patent are hereby corrected as shown below:

Column 13, line 9, "0.5" should read --0.05--.

Signed and Sealed this twenty-fifth Day of November 1975

[SEAL]

Attest:

RUTH C. MASON
Attesting Officer

C. MARSHALL DANN
Commissioner of Patents and Trademarks